Patented Nov. 10, 1953

2,658,835

UNITED STATES PATENT OFFICE 2,658,835

SIZING MEDIUM AND FILM SIZED THEREWITH

Roy P. Wymbs, Fredericksburg, Va., assignor to American Viscose Corporation, Wilmington, Del., a corporation of Delaware No Drawing. Application October 21, 1949, Serial No. 122,866

14 Claims. (Cl. 106—287)

This invention relates to improvements in smooth non-fibrous, non-porous sheets, films, and pellicles. The invention will be described in terms of regenerated cellulose film and sheets although it is to be understood that this is illustrative and not limitative.

This application is a continuation-in-part of my copending application Serial No. 75,295, filed February 8, 1949, now abandoned.

Thin, flexible regenerated cellulose pellicles are produced commercially from cellulosic solution by coagulation and regeneration, followed by purification, impregnation of the wet or gel film with an aqueous solution of a suitable softener, usually glycerol, and drying.

Cellulose has a strong affinity for water and even in the absence of other softeners will absorb a substantial amount of water from the surrounding atmosphere. If the surrounding atmosphere is of high relative humidity, the water absorbed is sufficient to contribute softness to the film so that only comparatively small amounts of an additional softening material are necessary to make the film commercially useful. However, in commercial practice, in order to make the film flexible and non-brittle at all humidities, a substantial amount of glycerol, sorbitol, or other non-volatile hygroscopic softening agents is incorporated in the film prior to drying it. The presence of the comparatively large amounts of softener results in films having poor slip characteristics and markedly increases the tendency of superimposed sheets or films to stick together, especially when pressure, even though moderate, is applied. Stacks of transparent regenerated cellulose sheets containing a softener are readily stuck together or caked by increases in moisture or pressure, and this cohering of the sheets has been a continuing problem affecting the commercial production of the films for many years.

An object of this invention is to provide a thin, flexible regenerated cellulose sheet or film containing glycerol or other softener and having good slip characteristics and resistance to sticking together.

It is another object of the invention to provide new compositions for softening regenerated cellulose films and sheets and improving the resistance thereof to sticking together.

The objects of this invention are accomplished by treating the regenerated cellulose sheets and films with a composition comprising a colloidal inorganic, water-insoluble solid material, and a self-emulsifying wax-like substance. In the preferred practice of the invention, the colloidal inorganic material, such as colloidal silica, kaolin, aluminum hydroxide, titanium oxide, etc., and the self-emulsifying, wax-like substance are applied to transparent regenerated cellulose sheets while the sheets are in the gel state and simultaneously with impregnation of the sheet with a softener or plasticizer, generally glycerol. Thus, the regenerated cellulose film or sheet is cast from viscose, desulfided, bleached, and washed free of impurities in the usual manner on the casting machine, and is then led through an aqueous bath containing glycerol, the colloidal inorganic material and a self-emulsifying, wax-like substance as exemplified hereinafter, prior to initial drying thereof. Before entering the drier, the excess treating composition may be removed by suitable squeeze rollers, scraper rods, doctor blades, or the like. The amount of colloidal material and self-emulsifying, wax-like substance associated with the gel film is controlled by adjusting the concentration of such agents in the bath or by varying the amount of excess removed.

By "self-emulsifying, wax-like substance" is meant a substance which emulsifies in water or aqueous media without the use of an extraneous emulsifying agent. The emulsifying wax-like substances which are preferably used in practicing the invention are the ethers and esters of polyhydric alcohols containing one or more free hydroxyl groups, and condensates thereof with ethylene oxide containing, for example, from 1 to 20, 50, or even to 100 or more ethylene oxide units per molecule. For example, the self-emulsifying wax-like material may be a butyl ether of a polyhydric alcohol such as ethylene glycol monobutyl ether, or it may be a partial ester of such alcohols, such as sorbitol, mannitol, glycol, glycerol, etc., with fatty acids such as stearic, oleic, myristic, lauric, etc.

Representative substances are:

glycerol monopalmitate
glycerol monostearate
diethylene glycol monostearate
ethylene glycol mono-oleate
diethylene glycol mono-oleate
sorbitol distearate
sorbitol tristearate
sorbitol tetrastearate or other partial esters of the alcohols with the higher fatty acids, and preferably such acids containing at least 8 carbon atoms. Such compounds as sorbitol mono-, di-, tri-, or tetra-stearate containing 6 ethylene oxide units, as well as substances of the type of polyethylene glycol monostearate containing 10 to 50 or more ethylene oxide units may be used. Esters from mixed fatty acids such as are obtainable from fish oils, vegetable oils, or animal fats, which may or may not be hydrogenated, may likewise be used. The esters may be in their pure state or in the form of their technical grades available on the market in which form they vary from liquid, oily, or pasty to firm masses which are generally readily meltable at temperatures slightly above room temperature.

Sheets or films treated in accordance with the invention are found to possess excellent resistance to sticking at high relative humidities and at the same time the surfaces are smooth and wax-like. These desirable surface characteristics result from the conjoint use of the colloidal inorganic insoluble material and self-emulsifying wax-like material.

The effects of the colloidal inorganic material and self-emulsifiable wax-like material are complementary.

The colloidal inorganic material imparts good slip characteristics to the surfaces of the sheets, preventing adherence of contiguous sheets in stacked or rolled relation, while the self-emulsifiable wax-like material serves to fix the colloidal silica on the surfaces of the sheets and provides them with a smooth, wax-like finish. The self-emulsifying wax-like material also functions to maintain the colloidal material in suspension in the plasticizing bath. This is generally a circulating system in which the colloidal silica or the like must remain in the suspended condition for a long period of time and under varying conditions, such as varying temperatures, stagnant periods in reservoirs, etc., and it is important for the colloidal silica to remain dispersed in the treating bath for a long period of time and under the varying conditions met with in the treatment and application of the bath.

Regenerated cellulose sheets or films having the same surface characteristics cannot be obtained by treating the sheets with a plasticizing bath containing colloidal silica, in the absence of the self-emulsifiable wax-like substance, or with a plasticizing bath containing a self-emulsifiable wax-like substance in the absence of the colloidal inorganic insoluble material, the surfaces of the sheets being "gritty" in the one instance, or more slippery than is practical, in the other.

The amount of colloidal inorganic insoluble material and of self-emulsifying, wax-like substance added to the plasticizer bath may vary, but generally these agents are added in equal amounts, the amounts of each being in the range of from 0.05 to 0.5%. Plasticizer baths containing colloidal silica and a self-emulsifying, wax-like material, such as glycerol monostearate, in an amount of 0.1% to 0.2% by weight of each, have been found to give excellent results.

The treating compositions may be prepared by forming a stable emulsion consisting of the colloidal inorganic material in the self-emulsifying wax-like substance, under heating, if desired or necessary, depending on the initial consistency of the particular self-emulsifiable wax-like material used, and adding the resulting highly stable emulsion to the plasticizing bath, with stirring; or the colloidal silica or the like and self-emulsifying wax-like material may be added to the plasticizing bath separately.

The following examples will illustrate a preferred mode of practicing the invention.

Example I

A sheet of regenerated cellulose in the gel condition, which had been cast from viscose, desulfided, bleached and washed free of impurities on the casting machine, was lead through an aqueous bath containing 5% by weight of glycerol, 0.1% of colloidal silica and 0.1% of glycerol monostearate. The excess treating bath was removed from the sheet by means of doctor blades, and the sheet was dried by passing it over a series of drier rolls.

Regenerated cellulose pellicles obtained as described were stacked in an oven, under pressure, at 120° F. for 16 hours. When they were removed from the oven, the sheets fell apart, showing no tendency to stick together.

Example II

The same procedure was employed as in Example I but 0.5% of colloidal silica and 0.5% of a condensation product of stearic acid with ethylene oxide containing 50 ethylene oxide units per molecule were employed in the glycerine bath. The resulting sheets were free of any tendency to stick together even after being stacked and heated at 120° F. for 16 hours.

A particular advantage of the present process is that it is carried out at very little increase in cost, using conventional equipment, and with simultaneous incorporation of the softener. Of course, an aqueous medium comprising colloidal silica or other colloidal inorganic insoluble material and a self-emulsifying wax-like substance as disclosed herein can be applied to films or sheets which have been dried as a step in their manufacture subsequent to impregnation thereof with a softener, and rewetted. However such procedure is not desirable because it requires an additional step in the preparation of the sheet for marketing, with consequent increase in the cost.

Although the invention has been discussed in detail in connection with the sizing of regenerated cellulose film sheets or pellicles in the gel state, it is also applicable to other smooth, non-fibrous, non-porous sheets and films which, due to their general nature or high content of softener have a tendency to stick together, and especially water sensitive sheets, films, or pellicles cast from aqueous or alkaline aqueous cellulosic solutions such as solutions of low-substituted cellulose ethers, esters, and ether-esters such as glycerol cellulose, methyl cellulose, ethyl cellulose, cellulose glycollic acid, and cellulose phthalic acid.

Obviously, changes and modifications can be made in the above-described methods and products without departing from the nature and scope of the invention. It is, therefore, to be understood that the invention is not to be limited except as set forth in the appended claims.

I claim:

1. As an article of manufacture, a film of a material selected from the group consisting of regenerated cellulose, and low-substituted, alkali-soluble cellulose ethers, esters and ether-esters, said film having a size thereon consisting of a colloidal, wholly inorganic, water-insoluble solid compound and a self-emulsifying, wax-like substance selected from the group consisting of a partial higher fatty acid ester of a polyhydric alcohol, a condensate of said ester with ethylene oxide, and a condensate of a higher fatty acid with ethylene oxide.

2. As an article of manufacture, a film of a material selected from the group consisting of regenerated cellulose, and low-substituted, alkali-soluble cellulose ethers, esters and ether-esters, said film having a size thereon comprising a colloidal silica and a self-emulsifying, wax-like substance selected from the group consisting of a partial higher fatty acid ester of a polyhydric alcohol, a condensate of said ester with ethylene oxide, and a condensate of a higher fatty acid with ethylene oxide.

3. As an article of manufacture a film as defined in claim 2 wherein said film is a regenerated cellulose film.

4. As an article of manufacture, a film of a material selected from the group consisting of regenerated cellulose, and low-substituted, alkali-soluble cellulose ethers, esters and ether-esters, said film having a size thereon comprising a colloidal silica and a self-emulsifying wax-like partial ester of a polyhydric alcohol with a higher fatty acid having at least 8 carbon atoms.

5. As an article of manufacture, a film of a material selected from the group consisting of regenerated cellulose, and low-substituted, alkali-soluble cellulose ethers, esters and ether-esters, said fiilm having a size thereon comprising colloidal silica and glycerol monostearate.

6. As an article of manufacture, a film of a material selected from the group consisting of regenerated cellulose, and low-substituted, alkali-soluble cellulose ethers, esters and ether-esters, said film having a size thereon comprising colloidal silica and a condensate of a partial higher fatty acid ester of a polyhydric alcohol with ethylene oxide, said condensate containing from 1 to 20 ethylene oxide units per molecule.

7. As an article of manufacture, a film of a material selected from the group consisting of regenerated cellulose, and low substituted, alkali-soluble cellulose ethers, esters and ether-esters, said film having a size thereon comprising colloidal silica and a condensate of stearic acid with ethylene oxide containing 50 ethylene oxide units per molecule.

8. A sizing emulsion suitable for use on films cast from aqueous, alkaline, cellulosic solutions, said emulsion comprising a colloidal silica and a self-emulsifying wax-like substance selected from the group consisting of a partial higher fatty acid ester of a polyhydric alcohol, a condensate of said ester with ethylene oxide, and a condensate of a higher fatty acid with ethylene oxide.

9. A sizing emulsion as in claim 8, wherein the self-emulsifying wax-like material is a partial ester of a polyhydric alcohol with a higher fatty acid having at least 8 carbon atoms.

10. A sizing emulsion as in claim 8, wherein the self-emulsifying, wax-like substance is glycerol monostearate.

11. An aqueous softening and sizing medium suitable for application to gel films of regenerated cellulose, said medium comprising a softener for the film, colloidal silica, and a self-emulsifying wax-like substance selected from the group consisting of a partial higher fatty acid ester of a polyhydric alcohol, a condensate of said ester with ethylene oxide, and a condensate of a higher fatty acid with ethylene oxide.

12. An aqueous softening and sizing medium for use on cellulosic films comprising colloidal silica, a softener for the film, and a self-emulsifying wax-like condensate of stearic acid with ethylene oxide containing 50 ethylene oxide units per molecule.

13. An aqueous softening and sizing medium suitable for application to gel films of regenerated cellulose as defined in claim 11 wherein there is employed 0.05 to 0.50% colloidal silica and 0.05 to 0.20% of the self-emulsifying substance.

14. An aqueous softening and sizing medium suitable for application to gel films of regenerated cellulose, said medium comprising 5% glycerol, 0.1% colloidal silica, and 0.1% of a condensate of stearic acid with ethylene oxide containing 50 ethylene oxide units per molecule.

ROY P. WYMBS.

References Cited in the file of this patent

UNITED STATES PATENTS

| Number | Name | Date |
|---|---|---|
| 2,226,554 | Drew | Dec. 31, 1940 |
| 2,251,752 | Mitchell | Aug. 5, 1941 |
| 2,308,732 | White | Jan. 19, 1943 |
| 2,329,179 | Beh | Sept. 14, 1943 |
| 2,408,656 | Kirk | Oct. 1, 1946 |
| 2,443,512 | Powers et al. | June 15, 1948 |
| 2,456,595 | Rood | Dec. 14, 1948 |
| 2,460,400 | Schlatter | Feb. 1, 1949 |